United States Patent [19]

Hammond

[11] Patent Number: 4,617,820

[45] Date of Patent: Oct. 21, 1986

[54] LEVEL CALIBRATING DEVICE

[76] Inventor: Richard D. Hammond, 2308 Concord, Las Cruces, N. Mex. 88001

[21] Appl. No.: 763,055

[22] Filed: Aug. 6, 1985

[51] Int. Cl.⁴ ............................................. G01C 25/00
[52] U.S. Cl. ........................................ 73/1 E; 33/375; 33/385; 33/392
[58] Field of Search .................... 73/1 J, 1 E, 1 R; 33/374, 375, 376, 384, 385, 391, 392, 399

[56] References Cited

U.S. PATENT DOCUMENTS

| 147,198 | 2/1874 | Thornley . | |
|---|---|---|---|
| 478,309 | 7/1892 | Burchinal . | |
| 565,096 | 8/1896 | Traut . | |
| 585,850 | 7/1897 | Patrick | 33/392 X |
| 787,940 | 4/1905 | Perks . | |
| 899,730 | 9/1908 | Haunty | 33/392 X |
| 991,446 | 5/1911 | Johnson | 33/392 X |
| 1,441,350 | 1/1923 | Herrman | 33/391 X |
| 1,590,575 | 6/1926 | Granstrom . | |
| 1,605,701 | 11/1926 | Brandt | 33/376 X |
| 1,683,509 | 9/1928 | Wescott . | |
| 1,963,805 | 6/1934 | Radke et al. . | |
| 2,118,470 | 5/1938 | Melvin . | |
| 2,154,625 | 4/1939 | Kleineschay . | |
| 2,373,641 | 4/1945 | Ackerson . | |
| 2,645,858 | 7/1953 | Davis | 73/1 E X |
| 2,795,859 | 6/1957 | Buschbach | 73/1 E X |
| 3,161,964 | 12/1964 | Myles | 33/376 X |
| 3,681,849 | 8/1972 | Venables, III . | |
| 3,803,722 | 4/1974 | Hinkley | 33/392 X |
| 4,302,962 | 12/1981 | Williams | 73/1 E |
| 4,322,890 | 4/1982 | Jarman et al. | 33/384 X |

FOREIGN PATENT DOCUMENTS

| 25763 | 2/1979 | Japan | 33/392 |
| 699325 | 11/1979 | U.S.S.R. | 73/1 E |

Primary Examiner—Stewart J. Levy
Assistant Examiner—Tom Noland
Attorney, Agent, or Firm—Schwartz, Jeffery, Schwaab, Mack, Blumenthal & Evans

[57] ABSTRACT

The invention is a level checking device having a pair of orthogonal surfaces which are positioned precisely as horizontal or vertical references, respectively. The device includes a mounting bracket which is used to mount the horizontal and vertical reference surfaces to a solid support. An adjustment is provided such that, with the mounting bracket appropriately mounted, the horizontal and vertical reference surfaces can be adjusted to be precisely horizontal and vertical. An indicator is also provided to indicate when the precise alignment has been achieved.

10 Claims, 10 Drawing Figures

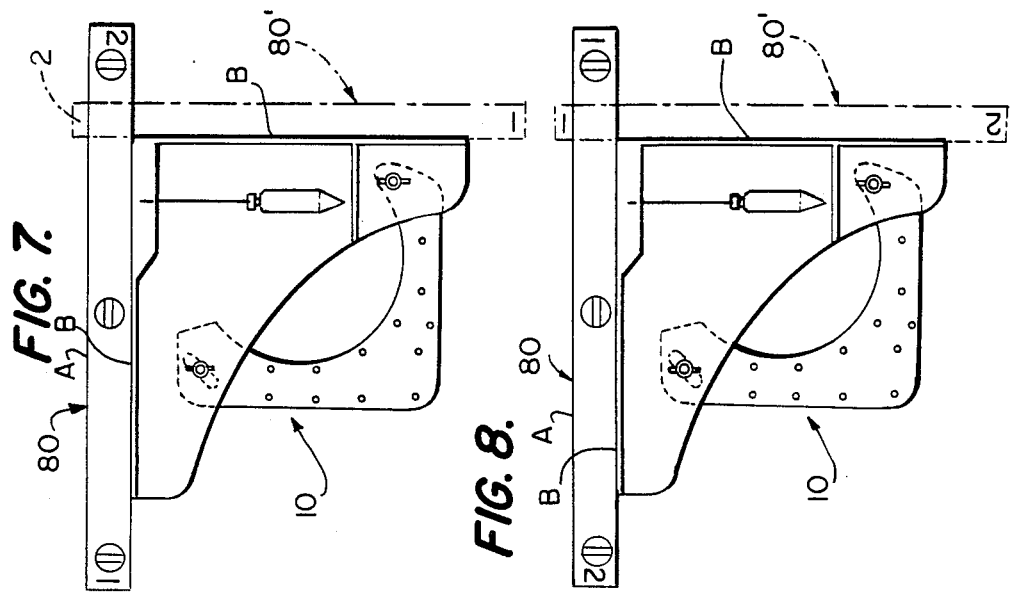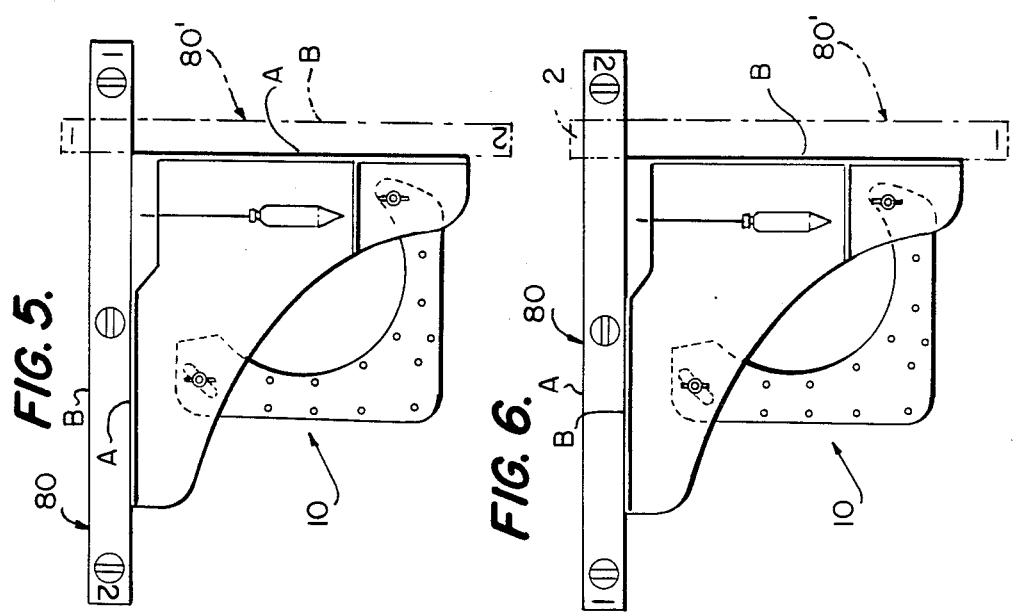

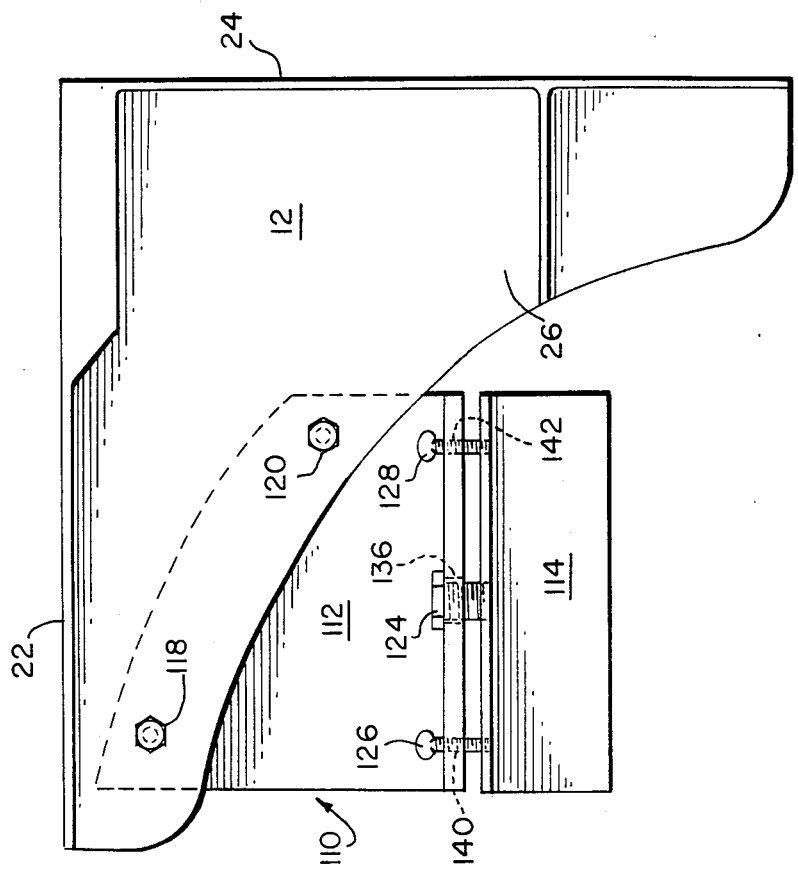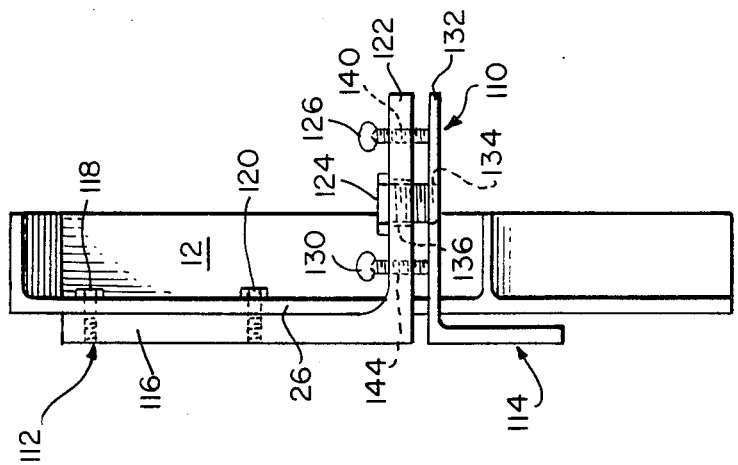

LEVEL CALIBRATING DEVICE

BACKGROUND OF THE INVENTION

1. Field of the Invention

The present invention relates to leveling instruments and more particularly to a device which can be used to check the accuracy of hand held levels.

2. Description of Related Art

Hand held levels have been used for many years to check the accuracy of vertical and horizontal surfaces. Such devices are essential instruments in the building trade. However, hand held levels can become inaccurate with age or may be manufactured improperly in the first place. Thus, if many workmen are at a particular project, each ones level may give a slightly different reading. If this occurs, it becomes impossible to determine which level is correct. Consequently, there has developed a need for a level checking device to determine the accuracy of such hand held levels.

U.S. Pat. No. 565,096 to Traut and U.S. Pat. No. 2,154,625 to Kleineschay show devices for repairing and correcting spirit levels. In the Traut device, the level being adjusted is turned end for end and the horizontal surface of the Traut device is adjusted each time the level is turned. The Kleineschay apparatus is adjusted to provide a level surface using an accurate level.

U.S. Pat. No. 2,373,641 to Ackerson shows a level having two pivotally connected members, the angle between which can be adjusted by a screw device.

U.S. Pat. No. 1,683,509 to Wescott shows another level having two pivotally connected elements, the angle between which can be adjusted by a screw mechanism.

U.S. Pat. No. 2,118,470 to Melvin shows a level device having mutually perpendicular surfaces so that both vertical and horizontal surfaces can be measured.

U.S. Pat. No. 787,940 to Perks shows another device having mutually perpendicular surfaces.

SUMMARY OF THE INVENTION

One object of the present invention is to provide craftsmen with the opportunity to check the accuracy of their hand held levels both as to the horizontal and vertical indicating functions of the level.

Another object of the present invention is to provide a device which can be used on site as a level checking device.

A further object of the present invention is to provide a level checking device which can be installed in a relatively permanent manner so as to enable a craftsman to make daily checks of level accuracy.

In accordance with the above and other objects, the present invention is a level checking device which comprises a L-shaped body member having a 90° angle between the legs of the L. The body member is inverted such that one of the legs is disposed horizontally and the other leg is disposed vertically. Mounting means are provided for holding the body member in a fixed position. Adjustment means are provided for permitting the body member to be moved slightly to adjust the vertical and horizontal legs. Furthermore, a measuring device is connected to the body member for indicating when the horizontal and vertical legs are exactly horizontal and vertical.

BRIEF DESCRIPTION OF THE DRAWINGS

The above and further objects of the present invention will become more readily apparent as the invention is more completely understood from the following detailed description, reference being had to the accompanying drawings wherein like reference numerals represent like parts throughout, and wherein:

FIGS. 5-8 demonstrate the use of the present invention in checking the accuracy of a hand held level;

FIG. 9 is a side elevational view of a level checking device of the present invention with a second embodiment of a mounting bracket; and FIG. 10 is a front elevational view showing the level checking device and mounting bracket of FIG. 9.

DESCRIPTION OF THE PREFERRED EMBODIMENTS

Figure 1:
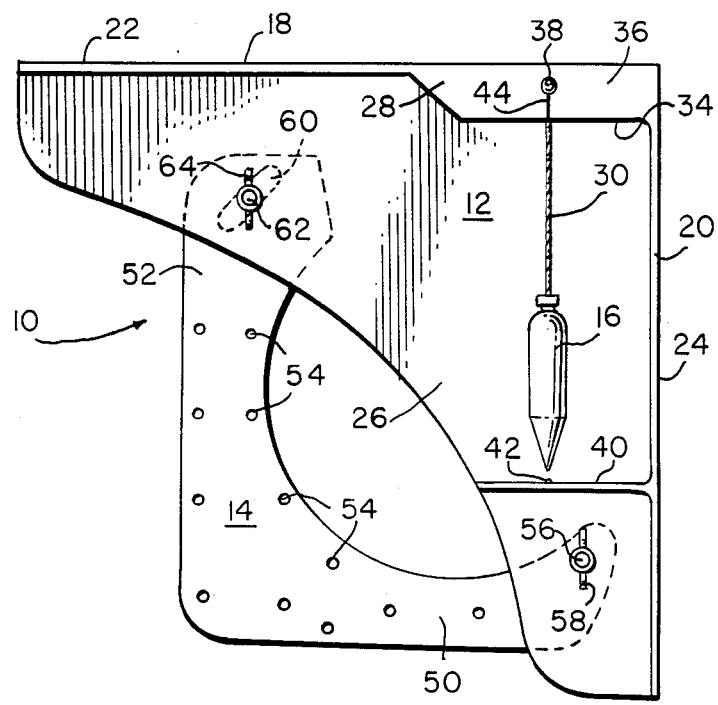
FIG. 1 is a front elevational view of a first embodiment of the level checking device according to the present invention.

With reference to FIG. 1, the level checking device 10 will be seen to comprise a main body 12, a mounting bracket 14, and a plumb bob 16.

The main body 12 can be formed of cast aluminum, plastic or any other suitable material. The body is shaped as an inverted L with a pair of flanges 18 and 20 extending along the two legs of the L. Flanges 18 and 20 have perfectly flat machined surfaces 22 and 24, respectively, which are used as measuring surfaces. The surfaces 22 and 24 meet at a 90° angle and are perfectly perpendicular to one another. Flanges 18 and 20 are connected to a plate 26 which is relatively thin. The flanges 18 and 20 provide rigidity to the plate 26 as well as provide measuring surfaces 22 and 24.

Flange 18 has a thickened portion 28 which is also connected to flange 20. The thickened portion 28 serves to strengthen the connection between flanges 18 and 20. This thickened portion also serves to mount the plumb bob 16 which hangs from a string 30. String 30 is mounted through an opening 32 which is formed at an angle such that the opening extends from the lower surface 34 of thickened portions 28 to the front surface 36. In forming the measuring devices 10, the string 30 is pushed through opening 32 and held in place with a bulbous member 38 which is attached to the end of the string emerging at the front surface 36. The bulbous member 38 may be a fishing sinker or the like.

Figure 2:
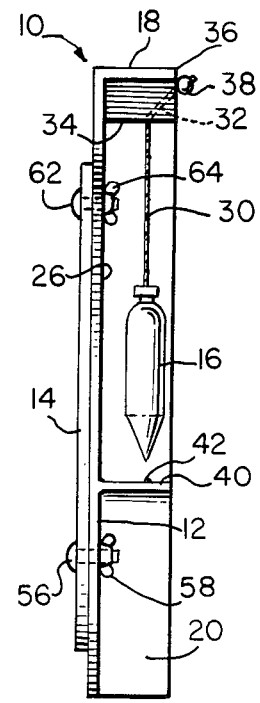
FIG. 2 is a left side elevational view of the level checking device of FIG. 1.

An additional flange 40 is formed generally parallel to flange 18 at a position spaced below flange 18. Flange 40 provides additional support and strengthening for the body 12 and, in addition, contains an indicator mark 42 which is spaced from surface 24 by an equal distance to the position of opening 32 in surface 34. A scribe line 44 is formed on surface 36 to indicate the position of opening 32. Accordingly, a line extending between scribe line 44 and indicator mark 42 would be perfectly parallel to surface 24. Accordingly, when plumb bob 16 points directly at indicator 42, surface 24 is perfectly vertical and surface 22 is perfectly horizontal. It should be noted that any type of marker 42 would suffice. This includes a scribe mark extending across the full width of flange 40. Alternatively, a single point marker can be used as shown in FIGS. 1 and 2.

Bracket 14 is also generally L shaped and has two legs 50 and 52 which meet with the legs of body 12. Bracket 14 can be formed of ⅛" steel or other suitable material and contains a plurality of holes 54 which serve to mount the bracket to a vertical surface such as a wall or the like. Nails, screws or other suitable mounting elements can be passed through opening 54 into the wall or the like. Also, since bracket 14 is suitably thin, it can be held conveniently within a vice or other similar device.

Leg 50 contains an opening through which a bolt 56 passes. Plate 26 has a similar aligned opening in it for receiving bolt 56. A wing nut 58 is screwed on to the end of the bolt. The wing nut can be loosened to permit bracket 50 to pivot about the bolt, or tightened to hold the bracket in place. Leg 52 has an elongated slot 60 formed in it through which a second bolt 62 passes. An opening is formed in plate 26 to receive bolt 62 and a second wing nut 64 is received on the end of bolt 62. Bolts 56 and 62 can be glued to mounting plate 14 or otherwise fixed against rotational motion. Accordingly, with bracket 14 held in place, wing nuts 58 and 64 can be loosened to permit sufficient movement of body member 12 to permit the plumb bob 16 to be aligned with indicator mark 14. The wing nuts 58 and 64 are then tightened and surfaces 22 and 24 are horizontal and vertical respectively.

In use, the level checking device 10 may be nailed to a stud wall, placed in a vice, clamped to a steel beam, etc. The device 10 must be secured so that it will not move while the hand level is being checked. As discussed above, the device is secured by using the mounting plate 14. When selecting a location to mount the level checker 10, it is important that the unit be positioned as close to vertical as possible. Once it is secured, its stability should be tested to be sure that it will not move even if considerable force is placed against its various surfaces.

The plumb bob used should be about five ounces and is attached by running the string 30 through hole 32. The string is secured at its upper end with a lead sinker or the like. The lower end of the string is attached to the plumb bob 16 in a conventional manner.

With the device 10 secured in place, wing nuts 58 and 64 are loosened, and the main body 10 is pivoted about bolt 56 until plumb bob 16 is aligned with marker 42. This alignment ensures that surface 22 is perfectly horizontal and surface 24 is perfectly vertical.

To check a hand level 80 as shown in FIGS. 5 through 7, the long edges of the level are labeled A and B respectively, while the ends are labeled 1 and 2, respectively. The A side of the level is first placed on horizontal surface 22 with the 1 end to the right as shown in FIG. 5. The level 80 is then read noting the relationship of the appropriate bubble or bubbles. The plumb bob of the level checking device 10 is also checked. Next, the ends 1 and 2 are exchanged as shown in FIG. 6 so that end 1 is now to the left. The level 80 is re-read and any change in the bubble readings is noted. Next, as shown in FIG. 7, the level 80 is flipped edge for edge so that edge B rests on device 10. The plumb bob is again checked and the bubble readings noted. Finally, as shown in FIG. 8, ends 1 and 2 are exchanged and edge B is kept on the checking device 10. Again, the bubbles are read on the hand level 80 and the plumb bob of device 10 is checked.

The vertical sides of the hand level can now be checked. This is done in essentially the same manner as the horizontal sides except that the vertical side surface 24 of the device 10 is used. First, the A side of the hand level is placed against the vertical surface of device 10 as shown in FIG. 5 with the 1 side up. The appropriate bubbles of the level are then read as well as the plumb bob of device 10. Then, the ends are swapped so that the 1 side is now down and the bubbles and plumb bob are again checked. The level is then flipped as shown in FIG. 7 so that the B side rests against device 10 with the 1 end down and the bubbles and plumb bob are again checked. Finally, the ends are swapped so that the 1 end is up with the B side against device 10. Once again, the bubbles and plumb bob are checked.

The above procedures are repeated for the horizontal and vertical sides of the hand level to ensure accuracy. At this point a decision has to be made as to whether or not the hand level is close enough to accurate to work with? Whether one side is better than the other? Whether the hand level should be corrected, and whether it can be corrected? The cause of the inaccurate reading should be determined if possible to correct it. Finally, if the readings are too far off, should the hand level be junked?

It should be noted that field calibration of a hand level can be conveniently performed using device 10 since flanges 18 and 20 are sufficiently wide and thin to enable a C clamp or some other type of edge clamp to be used to secure a hand level to one of these flanges. That is, the hand level can be directly attached to the horizontal or vertical surface of device 10.

Figure 3:
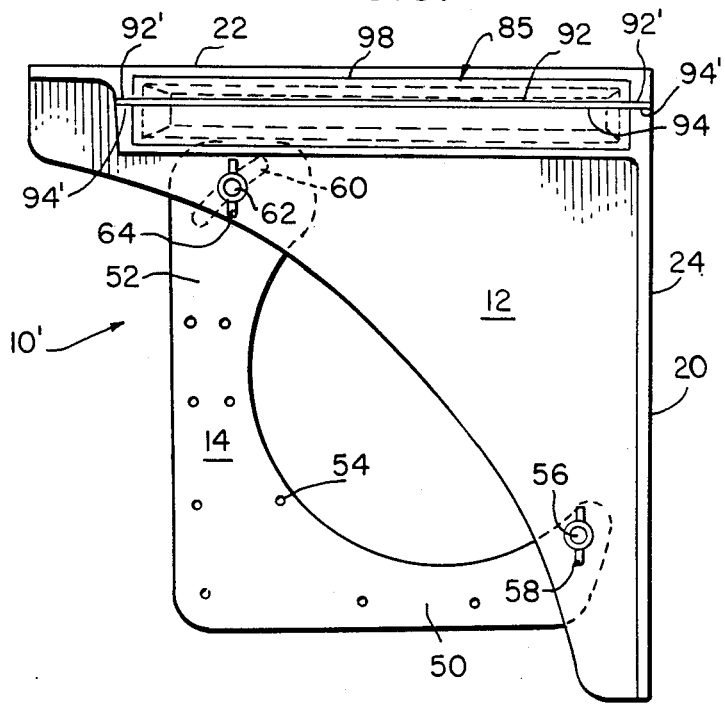
FIG. 3 is a front elevational view of a second embodiment of the level checking device according to the present invention.
Figure 4:
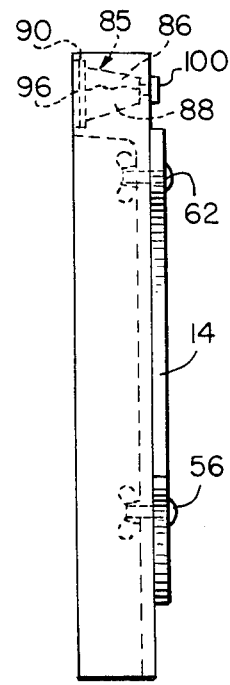
FIG. 4 is a right side elevational view of the level checking device of FIG. 3.

FIGS. 3 and 4 show a second level checking device 10' which is similar to level checking device 10 except that a liquid level 85 is used in place of plumb bob 16. The liquid level 85 comprises a liquid reservoir 86 containing liquid 88 and having a plexiglass cover 90. A pair of parallel lines 92 and 94 are scribed in the plexiglass surface and the liquid 88 is filled to the point where the surface 96 of the liquid appears between the parallel lines 92 and 94 when surface 22 is perfectly horizontal. Lines 92 and 94 should be perfectly parallel to surface 22. To accomplish this, the reservoir 86 is received in a cavity 98 formed in the main body 12. Parallel line extensions 92' and 94' are formed on both sides of the cavity. Accordingly, when the plexiglass plate 90 is placed over the liquid reservoir 86, the lines 92 and 94 must line up with line extensions 92' and 94' which are scribed exactly parallel with surface 22 when the body 12 is manufactured.

To ensure that the proper liquid level is used, a filler plug 100 is accessible from the rear of liquid level 85 so that liquid may be added to or removed from the reservoir 86.

Level checking device 10' is used exactly as explained with reference to level checking device 10. The only difference is that plumb bob 16 indicates a perfect vertical line whereas liquid level 85 indicates a perfectly horizontal line. However, in either case, both vertical and horizontal surfaces are established due to the 90° angle between surfaces 22 and 24.

FIGS. 9 and 10 show the body 12 of level checking device 10 connected to a mounting bracket 110. For clarity, the level indicating apparatus is not shown on body 12. It will be understood that either the plumb bob 16 or the liquid level indicator 85 may be used.

Mounting bracket 110 comprises an upper mounting plate 112 connected to a lower mounting plate 114. Mounting plate 112 is L-shaped with one leg 116 connected to plate 26 of body 12. Bolts 118 and 120 are provided for this purpose. These bolts pass through openings in body 12 and are received in threaded holes in leg 116.

The second leg 122 contains four thumb screws distributed symmetrically about a center bolt 124. Only three of the thumb screws 126, 128 and 130 are shown in the drawings. It will be understood that the fourth thumb screw is positioned symmetrically opposite thumb screw 126 relative to bolt 124.

The second plate 114 is preferably also L-shaped, although it may be a planar element. Plate 114 has a horizontal leg 132 which has a threaded opening 134 to receive bolt 124. Bolt 124 passes through an unthreaded, enlarged opening 136 formed in leg 122. Each of the four thumb screws passes through a threaded opening in leg 122 and abuts against the upper surface of leg 132. Three such threaded openings 140, 142 and 144 are shown in the drawings.

In use, plate 114 is attached to a firm mount such as a vice or the like. The thumb screws are then adjusted individually using the head of bolt 124 as a pivot point. In this manner, surface 22 can be adjusted to be perfectly horizontal and surface 24 can be adjusted to be perfectly vertical by changing the orientation of plate 112 relative to plate 114. It will be noted that opening 136 must be large enough to allow some pivoting movement of plate 112.

The foregoing description is provided for illustrating the present invention only and is not considered to be limitative thereof. Clearly, numerous additions, substitutions and other modifications can be made without departing from the scope of the present invention as set forth in the appended claims.

What I claim is:

1. A level checking device to determine the accuracy of a hand held level, comprising:
   a main body portion having two planar surfaces which are normal to one another, one of said surfaces establishing a horizontal reference and the other of said surfaces establishing a vertical reference;
   a mounting bracket connected to said main body and adapted for connection to a solid support structure;
   means for adjusting the orientation of said main body relative to said mounting bracket in order to adjust said main surfaces to act as horizontal and vertical references, respectively; and
   means connected to said main body to indicate when said surfaces are horizontal and vertical, respectively.

2. A level checking device as set forth in claim 1 wherein said indicating means comprises a plumb bob having one end connected to a first point on said main body spaced a known distance from said vertical reference surface, and a second point marked on said main body spaced an equal distance from said vertical reference surface such that when said plumb bob extends between said two points, said vertical reference surface is precisely vertical.

3. A level checking device as set forth in claim 1 wherein said indicating means comprises a liquid reservoir attached to said main body and having at least one indicating line which is parallel to said horizontal reference surface such that when a surface of said liquid is parallel to said reference line, said horizontal reference surface is precisely horizontal.

4. A level checking device as set forth in claim 1 wherein said main body comprises an inverted L shaped plate having a pair of laterally extending flanges which are normal to one another, said flanges having outer surfaces which act as said horizontal and vertical reference surfaces, respectively.

5. A level checking device as set forth in claim 1 wherein said mounting bracket comprises a thin plate having a plurality of mounting holes contained therein.

6. A level checking device as set forth in claim 5 wherein said adjustment comprises a slot formed in one of said main body and said mounting bracket, and a bolt passing through said slot and through an opening in the other of said main body and said mounting bracket.

7. A level checking device as set forth in claim 5 wherein said main body has two legs and said mounting bracket has two legs, said two legs of said mounting bracket being connected respectively with said two legs of said main body.

8. A level checking device as set forth in claim 1 wherein said mounting bracket comprises a pair of mounting plates, one of said mounting plates being attached to said main body portion, and means for connecting said mounting plates together to permit relative pivotal movement therebetween.

9. A level checking device as set forth in claim 8 wherein said means for permitting relative pivotal movement comprises a pivotal connection between said mounting plates and a plurality of adjusting screws surrounding said pivotal connection for changing the angular orientation of said mounting plates relative to one another.

10. A method of checking the accuracy of a hand held level, comprising:
    establishing vertical and horizontal reference surfaces by utilizing a pair of elements connected at 90° to one another, connecting said pair of elements to a mounting bracket, fixing said mounting bracket to a solid surface, adjusting said elements relative to said mounting bracket using an indicator such that one of said surfaces provides a precise reference thereby ensuring that the other of said surfaces also provides a precise reference;
    placing a hand held level having opposite longitudinal sides and opposite ends on the horizontal reference surface such that one of the longitudinal sides rests on the horizontal reference surface, and checking the indications of the hand held level;
    flipping the hand held level end for end and checking the indications provided by the hand held level;
    flipping the hand held level side for side such that the opposite longitudinal side rests on the horizontal reference surface and checking the indications given by the hand held level;
    flipping the hand held level end for end and checking the indications provided by the hand held level;
    holding the hand held level such that one longitudinal side rests against the vertical reference surface and checking the indications provided by the hand held level;
    flipping the hand held level end for end and again checking the indications provided by the hand held level;
    flipping the hand held level side for side such that the opposite longitudinal side rests against the vertical reference surface and checking the indications provided by the hand held level; and
    flipping the hand held level end for end and checking the indications provided by the hand held level.

* * * * *